C. P. HAUGHIAN.
ART OF MANUFACTURING ANGLE IRONS.
No. 183,159. Patented Oct. 10, 1876.
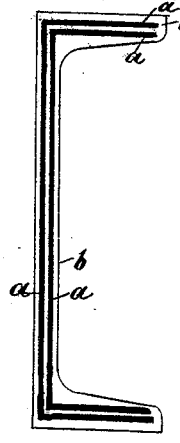
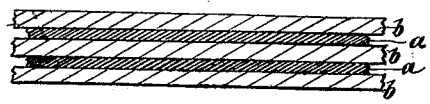
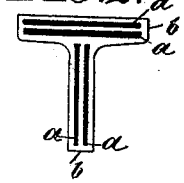
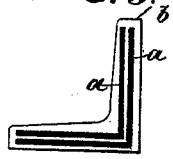
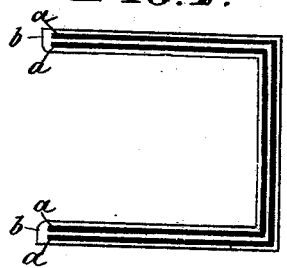
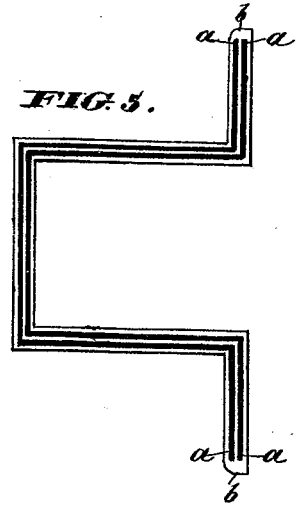
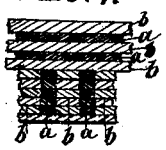
WITNESSES
Chas. J. Gooch
W. H. Pearce
INVENTOR
Charles P. Haughian
By Knight Bros. Attorneys
JAMES R. OSGOOD & CO. BOSTON

UNITED STATES PATENT OFFICE.

CHARLES P. HAUGHIAN, OF BROOKLYN, N. Y., ASSIGNOR TO WILLIAM ARTHUR, IN TRUST FOR WILLIAM ARTHUR, CHARLES P. HAUGHIAN, CASPER D. SCHUBARTH, AND JULIUS BAUR, OF SAME PLACE, AND ALFRED B. MULLETT, OF WASHINGTON, DISTRICT OF COLUMBIA.

IMPROVEMENT IN THE ART OF MANUFACTURING ANGLE-IRONS.

Specification forming part of Letters Patent No. 183,159, dated October 10, 1876; application filed December 18, 1875.

*To all whom it may concern:*

Be it known that I, CHARLES P. HAUGHIAN, of Brooklyn, in the county of Kings and State of New York, have invented a new and useful Improvement in the Art of Manufacturing Angles, Channels, T's, and other similar pieces of Compound Steel and Iron; and I hereby declare that the following is a correct description of my invention.

I take a suitable plate of wrought-iron, and lay on it a plate of chrome-steel of suitable thickness, (or vice versa,) repeating the process until there are as many alternate layers as may be desired of chrome-steel and wrought-iron. The plates are then secured together, if necessary, with straps of iron, or other suitable material, in such a manner as to hold them together in the proper position. The mass is then placed in a suitable furnace until the parts come to a welding-heat, when it is removed and passed through the rolls of an ordinary mill until the mass is reduced to the desired shape and thickness, when it will be found that the steel is inseparably welded to the iron, and that the relative thickness of the different layers has been preserved. The strength and stiffness of the compound article will also be found much greater than iron channels, &c., of the same dimensions.

The accompanying drawings show sectional views of various illustrations of my invention.

Figure 1 represents a channel-plate; Fig. 2, a T-plate; Fig. 3, an angle-plate; Fig. 4, a U-plate; Fig. 5, a flanged U-plate. Fig. 6 is a view of a pile, such as is used for the structures shown in Figs. 1, 3, 4, and 5. Fig. 7 is a view of the pile used for producing the compound T-bar shown in Fig. 2.

In each case, *a a* represent laminæ of steel, and *b b* laminæ of iron. The pile being brought to the necessary heat is first passed through the rolls to produce the weld, and is then subjected to successive passes through grooves of the necessary shape to produce the form of structure desired.

What I claim as new, and desire to secure by Letters Patent, is—

As an improvement in the art of manufacturing angle-irons, the method of first constructing a pile of alternate plates of iron and chrome-steel, heating the same to the proper temperature, and then passing the same flatwise between rollers, which, at the same time, welds the pile and imparts the initial bend, and repeating the passes through other grooves of properly-graduated forms until the bar has been brought to the desired shape, substantially as described.

C. P. HAUGHIAN.

Witnesses:
A. B. MULLETT,
C. L. SCHUBARTH.